(12) United States Patent
Sanz Gutierrez

(10) Patent No.: US 7,255,890 B2
(45) Date of Patent: *Aug. 14, 2007

(54) CONTINUOUS DIRECT ENZYMATIC PROTEIN SOLUBILIZATION PROCESS FOR INDUSTRIAL WASTES

(75) Inventor: Pedro Sanz Gutierrez, Sevilla (ES)

(73) Assignee: Peptonas Vegetales, S. L., Sevilla (ES)

( * ) Notice: Subject to any disclaimer, the term of this patent is extended or adjusted under 35 U.S.C. 154(b) by 334 days.

This patent is subject to a terminal disclaimer.

(21) Appl. No.: 10/336,660

(22) Filed: Jan. 3, 2003

(65) Prior Publication Data
US 2003/0165612 A1   Sep. 4, 2003

Related U.S. Application Data

(63) Continuation-in-part of application No. 09/957,396, filed on Sep. 20, 2001, now Pat. No. 6,706,312.

(30) Foreign Application Priority Data
Oct. 4, 2000   (ES) ............................. P 200002392

(51) Int. Cl.
*A23K 1/00*   (2006.01)

(52) U.S. Cl. ........................... 426/656; 426/52; 426/53; 426/618; 426/623; 426/629; 426/630; 426/807; 426/626; 426/634; 426/635

(58) Field of Classification Search ................ 426/656, 426/52, 53, 618, 623, 629, 630, 807, 626, 426/634, 635
See application file for complete search history.

(56) References Cited

U.S. PATENT DOCUMENTS 6,706,312 B2 *   3/2004   Sanz Gutierrez ............ 426/656

FOREIGN PATENT DOCUMENTS

EP   0908105   *   4/1999

OTHER PUBLICATIONS

Parrado et al. Production of Soluble Enzymatic Protein Hydrolysate from Industrially Defatted Nondehulled Sunflower Meal. J. Agric. Food. Chem. 1991. vol. 39. pp. 447-450.*

* cited by examiner

*Primary Examiner*—Anthony Weier
(74) *Attorney, Agent, or Firm*—Ladas and Parry LLP

(57) ABSTRACT

Continuous direct enzymatic protein solubilization process for industrial wastes. The present invention involves a sequential enzymatic process which enables solubilizing proteins that are present in determined industrial wastes, permitting the use of by-products. The wastes used can be of plant origin (rice bran, algarroba seed, etc.) or animal origin (*Procambarus clarkii* or American crab). The main process includes two steps: a first step of successive washings with acidified water and a second step of continuous enzymatic hydrolysis. Variants to the main process are shown without pretreatment of the wastes with acidified water. These solubilized protein wastes (peptones) have an application, among others, in the formulation of culture media, in the biosynthesis of pharmaceutical and food products, in clinical or dietetic nutrition, as additives in cosmetics and as components of organic fertilizers.

20 Claims, 3 Drawing Sheets

CONTINUOUS DIRECT ENZYMATIC PROTEIN SOLUBILIZATION PROCESS FOR INDUSTRIAL WASTES

This application is a continuation-in-part of U.S. application Ser. No. 09/957,396 filed Sep. 20, 2001, now U.S. Pat. No. 6,706,312.

TECHNICAL FIELD OF THE INVENTION

The present invention lies within the technical fields of the food industry, the medical-pharmaceutical industry and the chemical industry. The product resulting from the modification of the proteins of industrial organic wastes, known as peptones, will be of use in the following applications:
Human and animal nutrition
Clinical nutrition
Nitrogenous fermentation source in the pharmaceutical industry.
Soluble organic fertilizers

STATE OF THE ART PRIOR TO THE INVENTION

The generation of protein-rich industrial wastes is very high (only from sunflower, about one million tons in Spain). These wastes are not used at all, or are underused in the form of low added-value products.

This type of by-products constitutes a reservoir of proteins with a great economic potential.

The main obstacle for their direct use is constituted, on one hand, by the presence of anti-nutritional substances (pigments, alkaloids), and on the other by the deficient physical properties of proteins. One of these deficiencies is their insolubility, essentially motivated by the treatments to which these raw materials have been subjected in the industrial processes (high temperatures, treatments with organic solvents, etc).

The use of these peptones in the human and animal food industry, as well as in other types of industry, such as the pharmaceutical industry (nitrogenous fermentation source) or the chemical industry (organic fertilizers), requires the development of the appropriate processes:
a) For the elimination of undesirable substances: soluble sugars, fibers, alkaloids, etc.
b) For the extraction of protein leading to the recovery of the protein in the by-product, obtaining a new:, completely protein product, which is soluble under any condition, (temperature, pH and in the presence of metal ions).

The solubility of the recovered protein product will permit the use thereof in liquid products within the industrial fields mentioned above (clinical nutrition, enteral, parenteral and maintenance diets, fermentations, organic fertilizers, etc).

The solution to this problem will be the development of processes for the preparation of agro-industrial wastes for their conversion into suitable substrates with solubilized proteins.

The solubilization of these proteins will be carried out enzymatically, using proteases which will modify the proteins by the hydrolytic cleavage of their polypeptide chains, with the subsequent production of protein hydrolyzates (peptones).

Research in the field of human nutrition is currently focused on obtaining products that can be used to control chronic diseases such as arteriosclerosis, cancer, AIDS, hepatic and renal failure by means of the diet, as well as on obtaining products for weight control and for the nutritional control of hospitalized patients (Fürst, P (1989) Use of short chain peptides in clinical nutrition. J. Clin. Nutr. Gastroenterol., 205-211), and in animal nutrition the aim is to obtain specific diets for livestock animals (calf, fattened pigs and suckling animals, etc).

The use of protein hydrolyzates has a number of advantages a) The component peptides are absorbed very effectively in the digestive tract, as the original protein has already undergone a prior digestion, making absorption rapid and complete (Matthews, M. D. Protein absorption. Then and now. Gastroenterology 73, 1267-1279; 1977).
b) At a physiological level they have a better use than equivalent mixtures of free amino acids, and the osmotic pressure produced is much lower than that of the corresponding amino acid mixture.

In this context, the preparation of hydrolyzates is useful in the production of physiologically functional foods to cover specific needs, such as those intended for patients suffering malnutrition associated to cancer, severe burns, multiple traumatisms and hepatic diseases (Keith, M. E. and Jeejeebhoy K. N. Enteral nutrition in wasting disorders. Curr. Opin, Gastroenterol. 15, 159-166; 1999; Fischer J. E. Branched-chain enriched amino acid solution in patients with liver failure: An early example of nutritional pharmacology. J. Parenter-Enteral Nutri. 14, 249S-256S.; 1990), and as nutritional support in children with acute and chronic diarrhea or allergy to dairy proteins (Buzinco L., et al Anaphylactic reaction to a cow's milk whey protein hydrolyzate in infants with cow's milk allergy. Ann Allergy 62, 333-335, 1989).

With respect to other similar patented processes (WO98/23170 and WO92/11771), the main difference with the process of the invention is that in those patents, the enzymatic hydrolysis is carried out on soluble protein that was obtained with a previous chemical treatment of the wastes. This previous treatment generally consists of using soda at pH 10. In the present invention, the solubilization of the proteins is carried out by means of direct enzymatic extraction without prior chemical treatment. Additionally, WO98/23170 also employs a previous extraction with alcohol to eliminate the polyphenols present in the waste. In the present invention the polyphenols are removed by washing away with successive washings with acidified water. Not using soda or alcohol extraction steps implies a considerable saving in terms of equipment, facilities and solvents. Additionally, water is discharged into the environment, instead of more aggressive solvents that require more complex and costly previous treatment processes.

In Parrado et al. (J. Agric. Food Chem. 1991), a similar process is disclosed, but limited to degreased sunflower flour, using a specific protease (Kerasa©). Additionally, in said article, the process is carried out discontinuously in the laboratory in batches, whereas in this invention, it is continuously carried out, industrially, using any protease existing on the market and applied to a wide range of industrial wastes of plant origin.

DETAILED DESCRIPTION OF THE INVENTION

The present invention refers to processes leading to the direct protein solubilization of organic industrial wastes, specifically with the production of soluble peptones from said wastes.

Organic industrial wastes on which the following invention can be applied are, among others:
a) Degreased flours or cakes of oilseeds (sunflower, rape, soy, etc.).
b) Degreased flours or cakes of other seeds (cotton, corn, etc.).
c) Wastes originating from raw materials (barley, corn, wheat, rice, etc.) used in fermentation industries (production of bioalcohol, beer, etc.).
d) Algarroba seed by-products: Algarroba germ and others
e) Agro-industrial wastes: rice bran.
f) Animal wastes: crab industry.

This direct solubilization process, which consists of two well defined stages, is described hereunder:
1) Pre-treatment of the organic industrial wastes. All these organic industrial wastes have common features:
Protein composition between 20-35% of their weight.
Proteins of very low solubility due to prior industrial treatments.
Presence of unwanted substances in the final products since it would condition the use of the peptones. Among these contaminants it is worth mentioning:
Insoluble fibers due to having a great capacity to absorb compounds such as amino acids, small peptides and proteins, which reduces the bioavailability of the latter. Furthermore, as these fibers are insoluble, they would alter the organoleptic properties of the peptones, preventing their use in liquid products.
Soluble sugars. Due to nutritional reasons and to interactions with proteins.
Alkaloids. They are usually protease inhibitors and change the organoleptic properties of the products obtained, etc.

Organic industrial wastes will thus undergo the first pretreatment process that is depicted in FIG. 1.

The wastes (R) will be treated in an acidified flotation-sedimentation process (TES), pH 4-5.5 (in the range of 20/1 to 10/1 volume/dry weight of the waste), which will permit washing away the unwanted substances in the product to be solubilized and which could contaminate the final peptones.

The waste is homogenized in this acidified aqueous medium and is left to decant.

In said process, the low density insoluble fiber (FLC) is separated from the insoluble high-density protein pellets (FP) and is eliminated by mechanical means from the surface of the separation tank. Finally, the aqueous part (FS) is eliminated by means of decanters (D1) since it essentially contains sugars and alkaloids.

This same process is repeated with the insoluble protein fraction (FP), as there are still residues of unwanted substances, the number of repetitions (TN(i)) will depend on the nature of the waste, thereby, in sunflower cake, after the fifth wash, the chemical analyses reveal the absence of sugars and/or alkaloids in the acidified waters of the washings. It is mainly in this phase where the polyphenols are eliminated, which are the major alkaloids, especially in sunflower seed. At pH 5 of the acidulated water, polyphenols exhibit less interaction with proteins, and are washed out during the washes. After the fifth wash their presence in the acidified rinse waters is very low.

In this way, an industrial organic waste is obtained which is in optimal conditions to be solubilized and have its proteins extracted enzymatically, Without an exhaustive character and only as examples, a series of organic industrial wastes are described below that are valid for use in these peptone obtaining processes by direct protein solubilization.

EXAMPLE 1

Degreased Flours from Oilseeds

This is obtained by extraction with solvents and by pressure (prepress-solvent extraction) from oilseeds, mainly sunflower and rape, which leads to the generation of degreased flours with a high protein content ($\approx$30%).

The approximate chemical composition of said waste is detailed below. The values slightly vary depending on the production batch.

| Composition of degreased sunflower oil (%) | |
| --- | --- |
| Moisture | 10 |
| Proteins | 30.5 |
| Ashes | 9.5 |
| Fat | <1 |
| Sugars/Fiber | 58.5 |

EXAMPLE 2

Wastes from the Fermentations Industry

The wastes used as raw materials are those produced by the bioalcohol industry. In said process, a waste is produced that comes from both cereals (barley, wheat) and corn, whose composition is detailed.

Said by-products come from the enzymatic treatment (thermo-amylases), with the subsequent extraction and conversion of their sugared component into free sugars and their subsequent conversion into alcohol by means of alcoholic fermentation.

The final resulting waste is suitable for the direct protein solubilization process.

EXAMPLE 2.1

Wheat Wastes

The approximate chemical composition of said waste is detailed below. The values slightly vary depending on the production batch.

| Chemical composition % | |
| --- | --- |
| Moisture | 10.0 |
| Ashes | 5.5 |
| Proteins | 32.0 |
| Fats | 5.8 |
| Sugars/Fiber | 46.7 |

EXAMPLE 2.2

Barley Wastes

The approximate chemical composition of said waste is detailed below. The values slightly vary depending on the production batch.

| Chemical composition % | |
| --- | --- |
| Moisture | 9.8 |
| Ashes | 4.4 |

-continued

| Chemical composition % | |
|---|---|
| Proteins | 30.1 |
| Fats | 6.5 |
| Sugars/Fiber | 49.2 |

The approximate chemical composition of said waste is detailed below. The values slightly vary depending on the production batch.

| Chemical composition % | |
|---|---|
| Moisture | 10.4 |
| Ashes | 5.8 |
| Proteins | 24.5 |
| Fats | 9.8 |
| Sugars/Fiber | 49.5 |

EXAMPLE 3

Agro-Industrial Wastes

EXAMPLE 3.1

Rice Bran

Agro-industrial wastes resulting from rice production.

The approximate chemical composition of said waste is detailed below. The values slightly vary depending on the production batch.

| Chemical composition % | |
|---|---|
| Moisture | 10.5 |
| Ashes | 7.6 |
| Proteins | 13.8 |
| Fats | 13.9 |
| Sugars/Fiber | 54.2 |

EXAMPLE 4

Wastes from the Crab Industry (American Crab (*Procambarus clarkii*))

They are industrial wastes resulting from the harvest on extensive farms not subjected to breeding the crab (*Procambarus clarkii*) in captivity. Said wastes correspond to the free muscular parts of the shell of said crustacean.

The approximate chemical composition of said waste is detailed below. The values slightly vary depending on the production batch.

| Chemical composition % | |
|---|---|
| Moisture | 6.73 |
| Ashes | 4.12 |
| Proteins | 57.22 |
| Fats | 10.65 |
| Other components | 21.28 |

EXAMPLE 5

By-Products of the Algarroba Seed: Algarroba Seed and Others

They are industrial wastes resulting from the use of the algarroba seed, the material used is specifically the algarroba seed.

The approximate chemical composition of said waste is detailed below. The values slightly vary depending on the production batch.

| Chemical composition % | |
|---|---|
| Moisture | 2.5 |
| Ashes | 6–7 |
| Proteins | 46–47 |
| Fats | 6–7 |
| Soluble sugars | 6.5–7 |
| Other carbohydrates | 25–27 |
| Raw fiber | 5–6.5 |

2) Direct solubilization phase of the insoluble proteins of the protein concentrate free of polyphenols, soluble sugars and insoluble fiber.

The elaboration process of the products resulting from the aforementioned wastes, in synthesis, would entail:

A) Production of a protein concentrate from the organic wastes, using an extraction system of the sugars, fibers and minority compounds (polyphenols, minerals, organic phosphates, etc) in an aqueous acid phase.

Except in the case of organic biofertilizer production, wherein this step is omitted, the final peptone will include the previously indicated minority components, which are highly important in the plant physiology.

B) Direct protein solubilization using enzymes (proteases).

Once the protein concentrates are obtained, which have a high protein content as a main chemical feature and a high insolubility as a physical feature, these wastes are converted into peptones by means of the use of proteases (fundamentally broad spectrum, endoproteases).

C) Drying and storage of the obtained products.

As variants to this process, we can mention:

That the drying is complete until forming, by means of freeze-drying or spraying, a peptone powder, or that the drying is not complete, but rather that it becomes, by means of evaporation for example, a type of syrup, with a 40-70% solids content.

That the starting wastes are directly subjected to the enzymatic treatment by proteases, without the pretreatment step with acidified water.

That the rice bran wastes, not subjected to the pretreatment with acidulated water but hydrolyzed in the enzymatic step, in the form of syrup to pH, are subjected to a pH shift to 3.5 to then re-establish the starting pH 8. In this manner, the emulsion which form the syrup of the hydrolyzate is separated into a liquid phase, constituted of a peptone with a largely protein composition (about 80%), mainly formed by peptides and amino acids, with a sulfured amino acids (Met+Cys) rate of greater than 6%, free of lipids, and a whitish solid, pasty phase with a broad content of lipids, proteins, salts and antioxidants.

The obtained peptones have the main feature of having a high protein content in the form of free amino acids and peptides except in the production of biofertilizers, which, as they are directly hydrolyzed, omitting the pretreatment step for the extraction of minority components, have a relative component in their chemical composition which is formed by minerals, salts and free sugars.

In reference to its storage, the main treatment consists of eliminating water, with the subsequent reduction of volume and chemical/biological stability of the resulting products. Said reduction is carried out by means of using evaporators/atomizers until obtaining a product in powder form with a high stability.

This is the manner of use in the dietetic/food uses. Said peptones in powder form are easily used, for both their inclusion in solid products (due to their good rheological behavior in complex mixtures) and in the formulation of liquid products, as they are completely soluble.

With regard to the peptones used as organic liquid fertilizers, and due to their diluted use in crop fields, they are provided in liquid form but at an acid pH (3-4) since it is the suitable form for commercial dispensing.

More specifically detailed:

The protein solubilization process will be carried out in an enzymatic reactor (1) under controlled pH and temperature. The hydrolytic solubilization reaction will be carried out by an endoprotease. Any endoprotease present on the market can be used.

During the reaction, the substrate will exhibit a very remarkable physical change. At the beginning there are two well differentiated physical phases, one solid and another liquid, but throughout the development of the reaction, the solid phase gradually disappears due to the enzymatic extraction.

When the extraction finishes, a liquid paste is obtained that is clarified by means of centrifugation and/or filtration, obtaining, on one hand, a precipitate (solid paste -P.S.-) formed by residues of the insoluble substrate: starches, insoluble fibers and part of the undigested protein, and on the other hand, a liquid (liquid phase) with a dark appearance, composed of proteins, peptides and amino acids, which is the peptone (P).

The peptones are filtered and subsequently evaporated and concentrated until the powder peptone is obtained.

The solid or paste phase is used in different applications such as uses in animal nutrition and/or as an organic-manure substrate in agriculture.

The obtained results reach a degree of hydrolysis that can be greater than 50%, depending on the temperature and selected endoprotease, and a 60% to 80% solubilization of the original protein now present in the form of peptone, compared to the 35% attained with other alternative processes, such as that disclosed in WO98/23170.

A scheme of the process is shown in FIG. 2.

Any endoprotease existing on the market can be used, as the proteins to be solubilized present in the wastes are very susceptible to being hydrolyzed due to the treatments undergone by the raw materials from which said wastes originate, during the industrial processes where high temperatures, treatments with solvents, etc. are used.

The choice of the enzyme/s to be used will depend on their cost, availability, etc. Regarding the range of reaction temperatures, operation will be at a range of ±10° C. of the temperature at which each enzyme has its maximum activity with respect to the substrate to hydrolyze.

The products obtained in the previously described processes are peptones mainly formed by a single component (~90% amino acids). This product is the final product and will not be subjected to any type of mixture or treatment with chemical excipients.

These products are raw materials mainly used by companies in the food, pharmaceutical and cosmetic sector. Specific applications which can be mentioned are:

Fermentation Source in the Pharmaceutical Industry.

The commercial fermentation means used by the pharmaceutical industry for producing microbial metabolites (antibiotics, steroids, vitamins, etc) need a source of soluble organic nitrogen. The peptones obtained in the previously mentioned processes are used as a nitrogenous fermentation source, since they are completely soluble and, as they are mainly composed of peptides and free amino acids, they have a high bioavailability.

Protein Source in Nutrition.

The protein hydrolyzates with a characteristic amino acid composition and a defined molecular weight are very much in the interest of the food industry for their functional and nutritional features. (Clinical/Dietetic). Proteins are the most important components of body tissues and cells. They are involved in very important cellular processes such as the formation of enzymes, hormones, antibodies, bone tissues, contractile tissues: myofibrillar proteins that are necessary for muscular contraction (actin, myosin, tropomyosin).

The following is obtained from the previously mentioned peptones, with a protein supplement in both liquid and solid foods:

Protein contribution that is necessary for providing energy.

Tissue renovation.

Aids in recovery from lesions, micro-traumatisms and inflammatory processes.

Offsets the degradation of body proteins in physical resistance exercises.

In this context, the preparation of peptones is useful in producing physiologically functional foods for certain specific needs, such as patients with malnutrition associated with cancer, burns, trauma and hepatic encephalopathies, as well as a nutritional defense in children with chronic and acute diarrhea, or those who are allergic to milk protein.

Another object of this invention is to subject the wastes, particularly that of rice bran, to the enzymatic step without the initial pretreatment with acidified water, thereby obtaining a soluble hydrolyzate in which the proteins are still a majority of the composition thereof, but a larger component of carbo- and lipid hydrates already exists due to the lack of pretreatment.

The enzymatic extract obtained from the rice bran (Rbee) waste is the product which results from an enzymatic process consisting of converting the insoluble solid raw material (rice bran) into a soluble hydrolyzed product. It is a new potential nutraceutical derived from rice bran.

RBee is a water soluble enzymatic extract whose chemical composition can be seen in Table 1. As a result of its composition in carbohydrates, fats, proteins, antioxidants and vitamins, RBS is a potential nutraceutical for treatment and prevention in conditions of malnutrition and chronic pathological conditions, as well as for the elderly and athletes.

The chemical features of Rbee are detailed below.

TABLE 1

| PHYSICAL TECHNICAL FEATURES (%) W/W | |
|---|---|
| Protein | 50 |
| Fat | 14 |
| Carbohydrates | 19 |

TABLE 1-continued

| PHYSICAL TECHNICAL FEATURES (%) W/W | |
|---|---|
| Ash | 6 |
| Ca (mg/100 g) | 2 |
| Mg (mg/100 g) | 77.8 |
| Fe (mg/100 g) | 1.7 |
| Vitamin B1 (mg/100 g) | <0.1 |
| Vitamin B2 (mg/100 g) | 24.1 |
| Vitamin B12 (ug/mg) | 0.21 |
| Vitamin B6 (mg/100 g) | 1.8 |
| Antioxidants: | |
| Vitamin E (mg/kg) | 500 |
| Oryzanol (mg/gr) | 1.2 |

The chemical composition of rice bran shows that it contains a protein with a high nutritional value and low hypoallergenic feature, however, the main problem which limits the use of this protein is its high insolubility, due to the large amount of disulfide bonds.

The enzymatic process converts the solid insoluble raw material (rice bran) into a hydrolyzed soluble product, in which the proteins are the main component with regard to amount (38%).

The molecular weight of the components of the Rbee protein is shown in the table. The protein is mainly composed of peptides and free amino acids. In this manner, the bioabsorption of the protein is better than that of the original protein.

Molecular Weigh Distribution

| >10,000 Daltons | 3.25% |
|---|---|
| 10,000–5,000 Daltons | 2.75% |
| 5,000–1,000 Daltons | 9.45% |
| 1,000–300 Daltons | 17.74% |
| <300 Daltons | 66.81% |

The amino acid composition shows that the profile is very similar to that of the original protein. The main feature is the high sulfured amino acid content (methionine+cysteine) of 6.64%, which is very suitable for clinical nutrition.

Its functionality has also improved due to its complete solubility. Thus, it can be used in liquid foods. The amino acid composition is shown in table 2.

TABLE 2

| Amino Acids Composition | | |
|---|---|---|
| Amino acids (gr/100 gr) | Rice bran | Rbee |
| Asp | 7.44 | 6.48 |
| Ser | 5.83 | 6.28 |
| Glu | 11.56 | 9.57 |
| Gly | 6.19 | 7.25 |
| His | 4.03 | 5.42 |
| Arg | 11.57 | 12.77 |
| Thr | 5.19 | 6.29 |
| Ala | 5.37 | 5.48 |
| Pro | 5.01 | 4.92 |
| Cys | 2.74 | 2.40 |
| Tyr | 5.01 | 2.25 |
| Val | 6.41 | 6.48 |
| Met | 2.90 | 3.74 |
| Lys | 4.26 | 3.46 |
| Ile | 4.51 | 4.92 |
| Leu | 6.82 | 6.62 |
| Phe | 5.11 | 5.62 |

Regarding the composition in carbohydrates, Rbee has a rate of <14%, mainly composed of slow absorption carbohydrates, free of monosaccharides, for example glucose and fructose, or disaccharides, for example maltose, lactose and sucrose, and polysaccharides such as starch. This carbohydrates composition is very suitable for diabetics, the elderly and athletes due to its slow absorption. The carbohydrates composition is shown in Table 3.

TABLE 3

| CARBOHYDRATES | Hydrolyzed RBee (%) w/w | Non-hydrolyzed Rbee (%) w/w |
|---|---|---|
| ARABINOSE + RHAMNOSE | 0.0026 | 0.47 |
| GALACTOSE | 0.0060 | 0.33 |
| GLUCOSE | 0.029 | 12.0 |
| SUCROSE | 0.47 | — |
| XYLOSE | — | 0.31 |
| MANNOSE | 0.0022 | 0.18 |
| FRUCTOSE | — | 0.095 |

The fat components present in RBee are in a solution, due to the interaction with proteins, this solubilization process of the fat fraction was attained by means of the enzymatic process.

The fatty acids composition is shown in Table 4, the amount of linoleic acid is moderate among vegetable oils (34%), but it continues to be a rich source, furthermore, RBee contains a relatively high rate of oleic acid (41%). Thus, RBee does not have a very specific fatty acid profile, but it does contain a detectable amount of α-linolenic acid (2.3%).

This amount can be enough so as to increase the highly poly-unsaturated fatty acids content (ω–3), such as eicosapentaenoic and docosahexaenoic acids in the phospholipids of tissues, compared with other vegetable oils.

TABLE 4

| Fatty acids composition | RB | RBee |
|---|---|---|
| C10:0 Caproic acid | | 0.19 |
| C14:0 Myristic acid | 0.21 | 0.25 |
| C16:0 Palmitic acid | 16.42 | 17.96 |
| C16:1 Palmitoleic acid | 0.13 | 0.14 |
| C18:0 Stearic acid | 1.72 | 1.79 |
| C18:1 Oleic acid | 42.43 | 41.77 |
| C18:2 Linoleic acid | 36.38 | 34.95 |
| C18:3 Linolenic acid | 2.2 | 2.3 |
| C20:0 Arachidonic acid | 0.60 | 0.58 |
| C20:1 Icosanoic acid | 0.44 | 0.40 |
| C22:0 Behenic acid | 0.17 | 0.16 |
| C22:2 Docasanodienic acid | 0.10 | 0.14 |
| C24:0 Lignoceric acid | 0.28 | 0.30 |
| Saturated | 19.40 | 21.23 |
| Unsaturated | 43 | 42.46 |
| Polyunsaturated | 37.28 | 35.85 |

Unlike the majority of vegetable oils, it contains a rich unsaponifiable fraction (up to 5%), mainly composed of phitosterols, alcohols, triterpenes, feluric acid esters (γ-Oryzanol), tocopherols, tocotrienols and other unidentified minor components.

Feluric acid and derivatives thereof are polyphenol components with antioxidant and antibacterial activities, they protect skin and food due to their ability to stop cases of peroxidation of lipids. The main feluric acid derivative is γ-Oryzanol, a lipid-reducing agent that is effective in treating hyperlipidemia. They produce a decrease in triglycerides, LDL, VLDL, and an increase in the HDL in blood serum, in addition to a reduction of cholesterol in the liver.

In Cosmetic Applications.

The Protein Hydrolyzates are added to products for strengthening hair (shampoos and capillary tonics), penetrating the skin and being deposited in the cortex, since they aid in capillary and dermal regeneration.

Likewise, in the variant using the hydrolyzate obtained by direct enzymatic treatment of rice bran, in syrup form, from which a liquid peptone and lipid-rich creamy paste and antioxidants are separated, this solid phase obtained by pH shifting of the hydrolyzate syrup can also be used as an additive in cosmetic creams.

Organic Fertilizers and Soil Conditioners.

Organic fertilizers promote plant growth in many ways:

Directly

They directly supply nitrogen that can be used by plants, saving the use of energy involved in assimilating inorganic fertilizers.

They cause an increase in resistance to hydric stress, salinity, frosts, etc.

Growth hormone precursors. Tryptophan is the precursor of indolacetic acid which enhances the development of the radicular system.

Indirectly

They aid in metabolization of dead organic material already present in the soil, converting it into humus. This process fills and maintains fertility of the land in the long term and provides optimal conditions for biological activity of the soil.

They aid in the action of biopesticides, as they increase the microorganism populations.

They aid in the natural bioremediation and biodegradation processes, degrading the toxic organic chemicals.

They stimulate microbial activity around the root system, significantly increasing the root mass and improving the health of the plant.

They increase the nitrogen available for plants by much more than its own content by stimulating growth of natural microorganisms in the soil. These microorganisms in the soil metabolize the nitrogen from the air and they multiply it. When the latter die (some microorganisms have a life span of less than one hour), the nitrogen is then released in the soil such that it is quickly available for the plants.

These act reciprocally with other organisms in the soil and with biodegradable components thereof to supply essential nutrients such as nitrogen, phosphorus, calcium, copper, molybdenum, iron, zinc, magnesium and moisture to the plants.

They aid in dissolving manganese. It is believed that manganese plays an important role in both resistance to disease and in plant growth.

They increase the crop yield, as they improve growth and provide protection, since the improvement of plant growth is accompanied by a reduction of stress and greater resistance to disease.

They initiate and accelerate the natural decomposition of the crop wastes.

They effectively control incidents of disease caused by fungi, including pathogens in fruits and vegetables.

They significantly increase the yield and reduce incidents of disease in fruits, vegetables, tubers, flowers, trees, bushes, grass, grain, ornamental crops, etc.

They improve soil porosity, the drainage and ventilation, they reduce compaction and improve the soil's ability to retain water, thus helping plants resist drought, and they produce better crops in reduced moisture conditions.

A calculation indicates that a 5% increase of organic matter quadruples the ability of the soil to retain and store water.

They promote the sinking of unproductive soil, converting it into a productive growth medium.

They stimulate germination of seeds and root formation and growth.

They promote improved drainage.

They improve the ventilation of the soil.

They increase the protein and mineral content of the majority of the crops.

They produce thicker, greener and healthier crops.

They produce plants with a sweeter flavor and a higher nutrient content.

They improve germination of the seeds.

They aid in developing the system of roots that produce stronger and healthier plants and more capable of resisting plagues and drought conditions.

They increase the microorganism populations of the soil, which in turn increases the intake of nutrients from the soil to the plants.

They improve oxygen assimilation in plants.

They help to reconstruct depleted soil.

They help to balance the pH of the soil.

They help to reduce soil erosion.

Organic substrates, specifically peptones, have recently been shown to be excellent fertilizers in terms of their capacity to satisfy the nutritive necessities of plants, and a new property has been shown: they are products which generate fertile soil. Therefore, they are a new way to understand agricultural productivity, ideal for conventional crops and essential in ecological crops.

These wastes have a great potential to be converted into the aforementioned products if processes are developed that lead to the solubilization of organic components (proteins, sugars) and extraction of inorganic components (salts, metals, oligoelements, etc). Proteins are among the main components, which are physically inaccessible by the plants due to their insolubility and their large size, preventing their absorption by both plants and edaphic microflora.

By means of enzymatic technology, both problems are resolved, since the cleavage thereof into their elemental units (amino acids) and to peptides leads to an extraction of the insoluble proteins from the wastes, and to a physical change, as the resulting peptones are completely soluble, and, on a plant physiology level, to a quick entry at both a follicular and radicular level.

This hydrolysis process would be carried out by means of an enzymatic route. Thus, the process is not chemical, with the subsequent advantages in both the quality of the final product: all the amino acids are conserved, there being no nutritional losses; as well as at a technological level: the process is technologically controllable (type of enzymes, reaction times, etc.), therefore leading to product homogeneity and to the possible design of different types of hydrolyzates. Lastly, the process is completely biological, as it is non-contaminating (neutral pH, no use of chemical products).

The protein quality of this product, mainly formed by peptides, is greater than that of free amino acid mixtures, since the latter are unstable (tryptophan, precursor of plant hormones inducing plant growth (indolacetic acid), is quickly destroyed by sunlight in its free form, and all hydrophobic amino acids can not be administered through liquids due to the insolubility thereof (tryptophan, valine, isoleucine, leucine, etc).

The peptones to be used in manufacturing organic fertilizers are generally obtained without pretreatment so that they contain, in addition to the protein component nitrogen source, oligoelements, phosphorus, etc., all being beneficial for plant growth.

Antioxidant Action.

The RBee contains higher amounts of oryzanol than the original raw material (rice bran). The hydrolytic process leads to a selective extraction of the oryzanol present in the solution.

However, the antioxidant activities of the γ-oryzanol against oxidation of the biomolecules in the tissues under endogenous oxidative stress have not been described.

The invention uses Rbee as a source of γ-oryzanol, hereinafter, the studies will be referred to as total RBee, which include other minor antioxidants such as vitamin E.

Research of its antioxidant function have thus been carried out so as to prevent protein oxidation and peroxidation of the lipids under etching by free radicals.

To study the role of RBee as a neutralizer of free radicals, it is necessary to determine the ability to stop oxidizing modifications of the hepatic proteins generated by a typical inducing agent of oxidizing stress, such as cumen hydroperoxide.

Protection against damages caused by the substances activated by oxygen has been shown, measuring the lipid peroxidation and oxidation of the proteins induced by the cumen hydroperoxide in hepatic extracts. The results show a large ability to prevent the occurrence of oxidized molecules in the tissues subjected to oxidative stress.

Measurement of the total antioxidant capacity of RBee has also been carried out. This data shows that RBee has an antioxidant capacity that is similar to that of vitamin E, as shown in FIG. 3.

Figure 1:
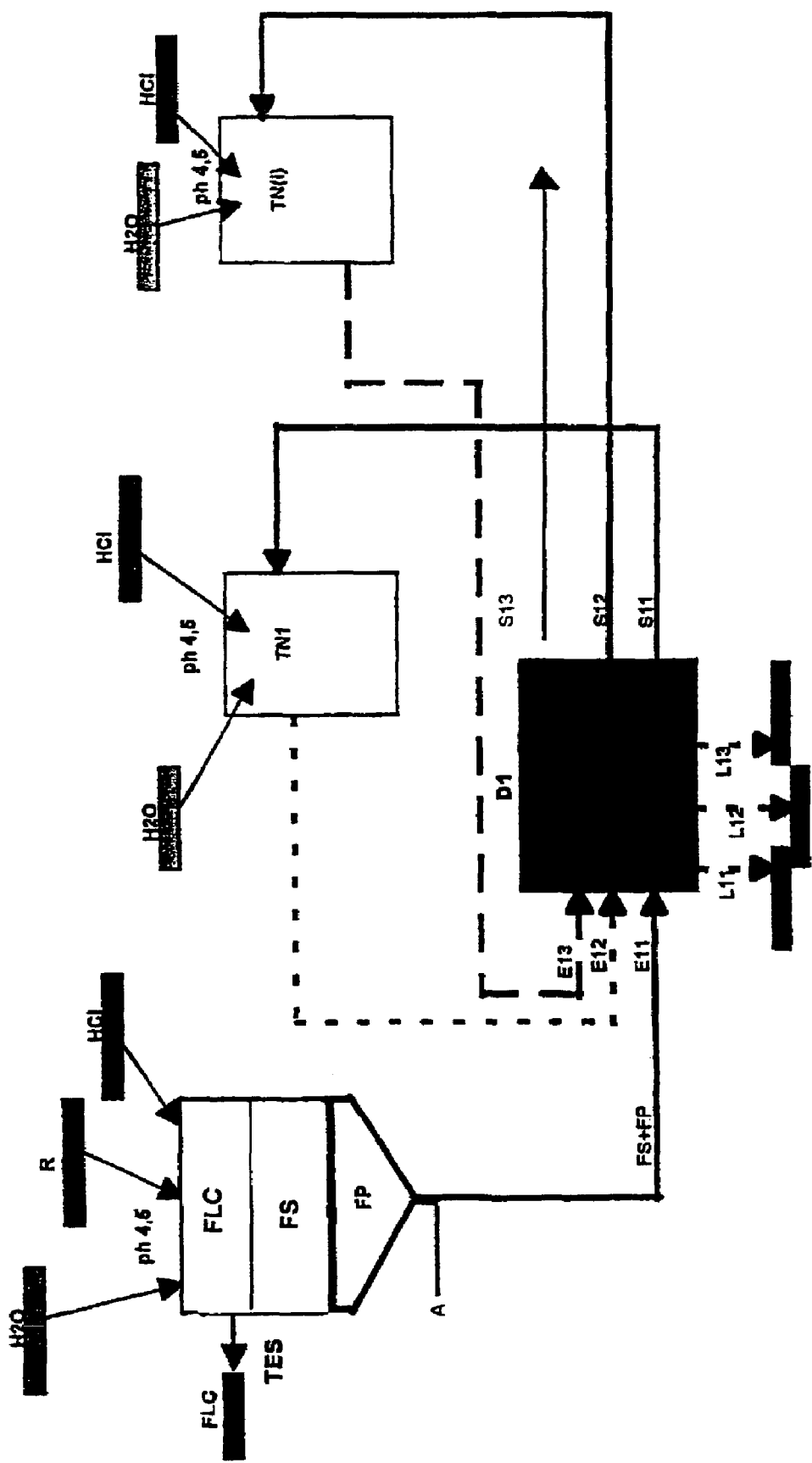
FIG. 1: Separation tank (TES) with aeration, pH control and mechanical separation of floating elements: lignocellulose fraction or low density insoluble fraction (FLC); Soluble Fraction (FS): Protein Fraction (FP); Decanter (D1) where solids are separated by centrifugation; Air (A); organic waste (R); Separation tanks (TN1), TN(i), where (i) represents the number of washing stages where washing takes place with acidified water. Protein concentrates (S11, S12, S13); FS+RP recycled (E11, E12, E13); FS eliminated from each cycle (L11, L12, L13).
Figure 2:
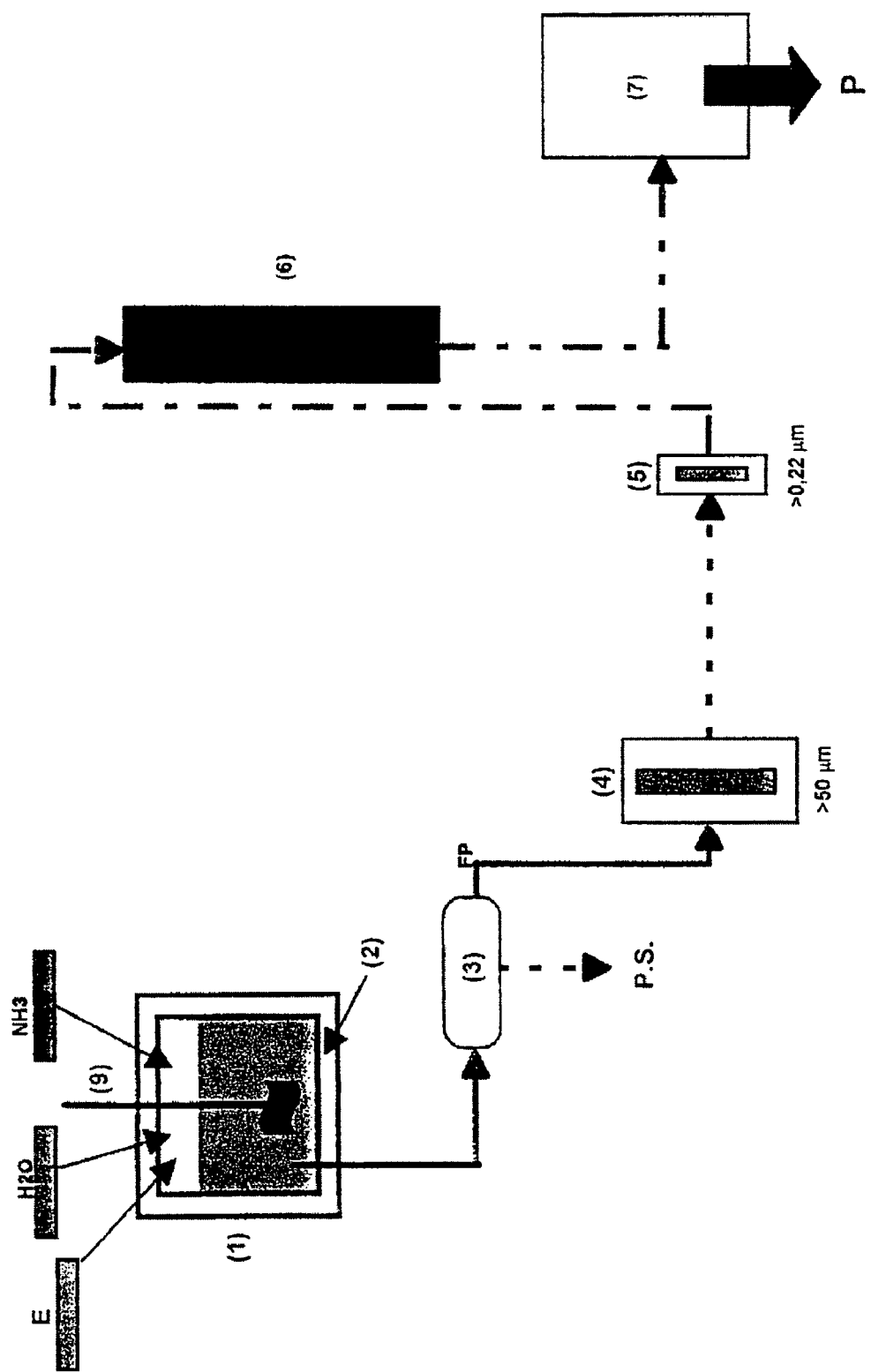
FIG. 2: Endoprotease enzymes (E); Enzymatic reactor (1); Thermal chamber (2); Ultracentrifuge (3); Filter system (4-5); Evaporator/Concentrator (6); Atomizer (7); Solid paste (PS); Stirrer (9); Peptones (P).
Figure 3:
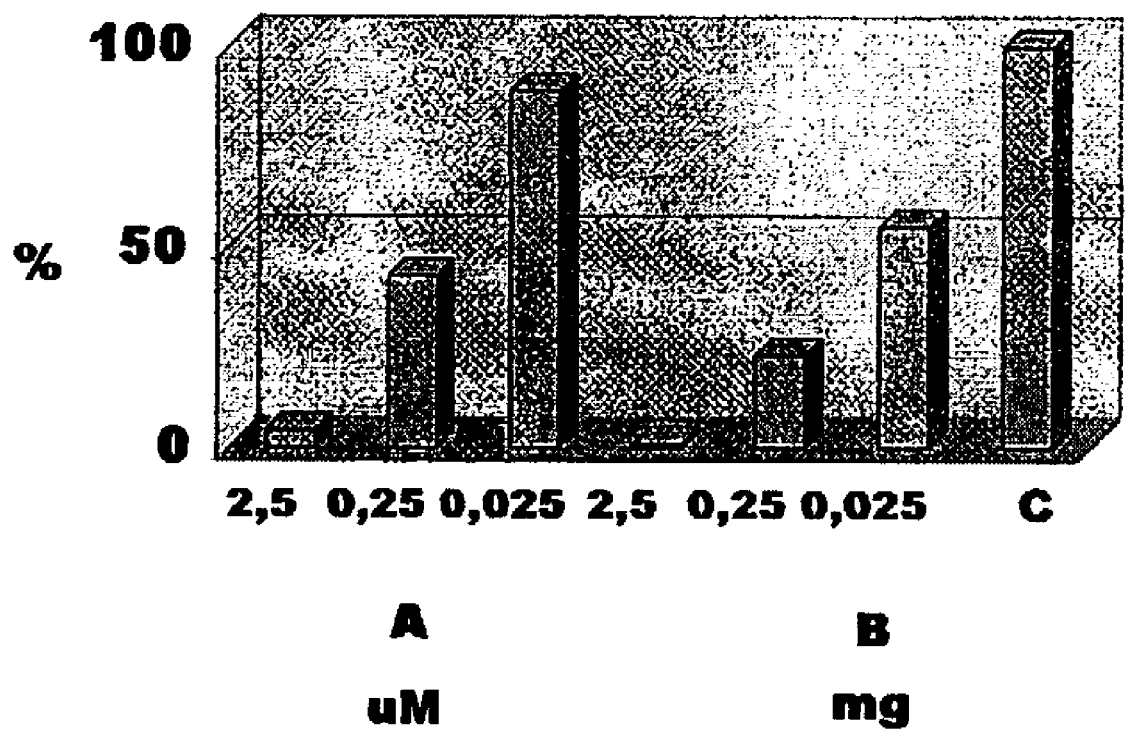
FIG. 3: Evaluation of the neutralizing capacity of the free radicals of Rbee using a test based on fluorescent Pheoerythrin for peroxy radicals. Abscissae A: Vitamin A; B: Rbee; C: Control; Ordinates: oxidation rate.

The invention claimed is:

1. A process for treating an industrial waste, the industrial waste comprising an insoluble starting protein, the process consisting of the steps of:
(a) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars
(b) clarifying the liquid paste to separately recover the first and second products and, optionally
(c) filtering, sterilizing, evaporating, and concentrating the liquid phase into a powder.

2. A process for treating an industrial waste of plant origin, the industrial waste comprising an insoluble starting protein, the process consisting of the following steps: pretreating the waste with successive washings of acidified water, at a pH range of 4 to 5.5, in order to wash out alkaloids, enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars, wherein the enzymatic reacting step follows in a continuous process and clarifying the liquid paste to separately recover the first and second products.

3. The process of claim 2, wherein the alkaloids include polyphenols, sugars, and fibers.

4. A process for treating an industrial waste of plant origin, the industrial waste comprising an insoluble starting protein, the process consisting of the following steps:
(a) pretreating the waste with successive washings of acidified water, at a pH range of 4 to 5.5, in order to wash out alkaloids,
(b) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars, wherein the enzymatic reacting step follows in a continuous process,
(c) clarifying the liquid paste separately to recover the first and second products,
(d) evaporating the liquid phase until a liquid syrup containing from 40 to 70% solid content is formed and, optionally,
(e) subjecting the liquid syrup to a cleavage of the syrup into a liquid phase substance with a majority protein content and a solid phase substance with a majority lipid content.

5. The process of claim 4, wherein the cleavage is accomplished by a pH shift.

6. The process of claim 1, wherein the industrial waste comprises a degreased flour or a cake of seed.

7. The process of claim 6, wherein the seed is selected from the group consisting of sunflower seeds, rape seeds, soy seeds, cotton seeds, corn seeds, algarroba seeds, and seeds from oleaginous plants.

8. The process of claim 1, wherein the industrial waste is derived from a raw material used in industrial fermentation.

9. The process of claim 8, wherein the raw material comprises barley, corn, wheat, or rice.

10. The process of claim 1, wherein the industrial waste is of animal origin.

11. The process of claim 1, wherein the industrial waste comprises rice bran.

12. The process of claim 1, wherein the industrial waste comprises waste from a crab-raising farm.

13. The process of claim 12, wherein the waste comprises *Procambarus clarkii*.

14. A process for treating an industrial waste, the industrial waste comprising an insoluble starting protein, the process consisting of the steps of:
   (a) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars
   (b) clarifying the liquid paste to separately recover the first and second products;
   (c) recovering the second product and
   (d) feeding it to an animal.

15. A process for treating an industrial waste, the industrial waste comprising an insoluble starting protein, the process consisting of the steps of:
   (a) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars
   (b) clarifying the liquid paste to separately recover the first and second products;
   (c) recovering the solubilized peptones and
   (d) introducing them as a nitrogen source into a culture media for fermentation.

16. A process for treating an industrial waste, the industrial waste comprising an insoluble starting protein, the process consisting of the steps of:
   (a) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars
   (b) clarifying the liquid paste to separately recover the first and second products;
   (c) recovering the solubilized peptones and
   (d) introducing them as an additive into a food composition.

17. A process for treating an industrial waste, the industrial waste comprising an insoluble starting protein, the process consisting of the steps of:
   (a) enzymatically reacting said waste with an endoprotease to attain a degree of hydrolysis ranging from 25 to 40% to obtain a liquid paste comprising a first product that is a liquid phase consisting essentially of solubilized neptones at a concentration ranging from 60 to 80% of the insoluble starting protein, and a second product that is a solid phase consisting essentially of non-solubilized proteins, starches, and insoluble sugars
   (b) clarifying the liquid paste to separately recover the first and second products;
   (c) recovering the solubilized peptones and
   (b) introducing them as an additive into a cosmetic composition.

18. A process for treating an industrial waste, the industrial waste comprising an insoluble starting protein, the process consisting of the steps of:
   (a) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars
   (b) clarifying the liquid paste to separately recover the first and second products;
   (c) recovering the solubilized peptones and
   (d) introducing them as an ingredient in organic fertilizer.

19. A process for treating an industrial waste of plant origin, the industrial waste comprising an insoluble starting protein, the process consisting of the following steps:
   (a) pretreating the waste with successive washings of acidified water, at a pH range of 4 to 5.5, in order to wash out alkaloids,
   (b) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars, wherein the enzymatic reacting step follows in a continuous process,
   (c) clarifying the liquid paste separately to recover the first and second products,
   (d) evaporating the liquid phase until a liquid syrup containing from 40 to 70% solid content is formed and, optionally,
   (e) subjecting the liquid syrup to a cleavage of the syrup into a liquid phase substance with a majority protein content and a solid phase substance with a majority lipid content; and
   (f) combining the liquid phase product and the solid phase product to form an antioxidant.

20. A process for treating an industrial waste of plant origin, the industrial waste comprising an insoluble starting protein, the process consisting of the following steps:
   (a) pretreating the waste with successive washings of acidified water, at a pH range of 4 to 5.5, in order to wash out alkaloids,
   (b) enzymatically reacting said waste with an endoprotease to attain a degree of hydrolysis ranging from 25 to 40% to obtain a liquid paste comprising a first product that is a liquid phase consisting essentially of solubilized peptones at a concentration ranging from 60 to 80% of the insoluble starting protein, and a second product that is a solid phase consisting essentially of non-solubilized proteins, starches, and insoluble sugars, wherein the enzymatic reacting step follows in a continuous process,
   (c) clarifying the liquid paste separately to recover the first and second products,
   (d) evaporating the liquid phase until a liquid syrup containing from 40 to 70% solid content is formed and, optionally,
   (e) subjecting the liquid syrup to a cleavage of the syrup into a liquid phase substance with a majority protein content and a solid phase substance with a majority lipid content; and
   (f) introducing the liquid phase product and the solid phase product into a cosmetic or pharmaceutical cream as an ingredient.

* * * * *